United States Patent [19]

Belko, Jr.

[11] Patent Number: 4,928,821
[45] Date of Patent: May 29, 1990

[54] SPRING TENSION HOLDING MEANS

[76] Inventor: William R. Belko, Jr., 2005 Pintoresco Ct., Rancho La Costa, Calif. 92009

[21] Appl. No.: 216,893

[22] Filed: Jul. 8, 1988

[51] Int. Cl.$^5$ .............................................. B65D 73/02
[52] U.S. Cl. .................................... 206/329; 206/328; 206/486; 206/490; 206/562
[58] Field of Search .................... 206/45.14, 328, 329, 206/334, 347, 486, 490, 523, 524, 562, 563, 564, 566, 443; 269/900, 903; 118/500, 503

[56] References Cited

U.S. PATENT DOCUMENTS

| 2,119,832 | 6/1938 | Schless | 206/562 |
| 2,333,715 | 11/1943 | Hahnemann | 206/562 |
| 3,233,725 | 2/1966 | Bixler | 206/45.14 |
| 3,462,020 | 8/1969 | Hall | 206/45.14 |
| 3,481,462 | 12/1969 | Chapel | 206/564 |
| 3,977,522 | 8/1976 | van der Aker et al. | 206/486 |
| 4,381,321 | 4/1983 | Braden | 427/79 |
| 4,393,808 | 7/1983 | Braden | 118/503 |
| 4,395,184 | 7/1983 | Braden | 414/417 |
| 4,598,821 | 7/1986 | LaBarbara et al. | 206/331 |
| 4,669,416 | 6/1987 | Delgado et al. | 118/503 |

Primary Examiner—David T. Fidei
Attorney, Agent, or Firm—Arnold Grant

[57] ABSTRACT

A device for holding and moving miniature electronic components utilizing an elastomeric material which grasps the sides of such components is described.

5 Claims, 1 Drawing Sheet

SPRING TENSION HOLDING MEANS

FIELD OF THE INVENTION

This invention relates generally to the processing of miniature electronic components, e.g., ceramic chip capacitors and resistors. More particularly the present invention relates to a device for holding and moving such components during various stages in their manufacture and testing.

BACKGROUND OF THE INVENTION

The size and shape of miniature electronic components complicates automatic and batch processing. Typically fabricated in monolithic form with brick like shapes and squared edges, these difficult to handle components require precision handling techniques and equipment if they are to be processed efficiently.

End coating of chip capacitors provides a case in point. The ends are coated with metal to electrically interconnect the electrode layers of the capacitor. The end coating also provides a suitable site for soldering and, thus, subsequent electrical and mechanical connection to an electronic circuit. The coating is usually applied by dipping the capacitor into, or spraying a metal-based paint or sputtering metal directly onto, the end of the component.

The typical holding fixture, shown for example in U.S. Pat. Nos. 4,669,416, 4,395,184, 4,393,808, and 4,381,321 comprises a metal plate having holes lined with an elastomeric material. The holes are round and smaller than the components they are intended to hold.

According to these patents, vacuum assisted vibration equipment loads a component into each one of the regular array of funnel shaped openings in a rectangular loading plate. A bank of pins in a press then transfers the components from the loading plate to corresponding holes in the holding fixture. The components are forced into the elastomeric lined holes and are frictionally held by the expansive forces of the elastomeric material. The elastomeric material is, in turn, being compressed by the larger dimensions of the held component.

As best shown in FIG. 1, a problem arises due to the space 10 created between the round edge 12 of the holding fixture 14 and the flat surface 16 of the component. I.e., the holding fixture cannot effectively mask or protect the body of the component from also being coated with metal in the case of metal paint spraying or metal sputtering. This, in turn, can cause shorting or degradation of the component and result in a rejected part.

Existing carrier plates are usually fabricated from a rectangular aluminum plate having a size on the order of 7" by 11" by 11/32" thick. A regular array of holes is predrilled in the plate, a pattern of 51 holes by 83 holes for a total of 4,233 holes being typical. The hole size, and consequently the array size, may differ according to the size of the components to be handled.

Once the holes have been formed, the plate is coated with a compliant material that fills the holes. An elastomeric coating such as silicon rubber resin is often employed for this purpose.

After the compliant material cures, a new set of smaller holes, on the order of 0.046" to 0.110" in diameter (again depending on component size) is drilled or molded in line with the original holes, so that a coated plate with an array of lined holes results. These resulting holes, or receptor holes, are slightly smaller than the components to be handled, so that the components can be gently forced into the receptor holes and retained in place for end coating.

Thus, existing holding fixtures involve a multi-step fabrication process that is time consuming and correspondingly expensive to accomplish. In addition, special procedures must be employed to apply the compliant material to the plate, followed by a second precise drilling or molding operation to complete the receptor holes. Consequently, it is desirable to have a new and improved holding fixture design that is more convenient and less expensive to fabricate.

Once fabricated, existing holding fixtures experience abrasive wear and temperature degradation during use. This is because of the frictional force fit needed when square or rectangular cross-sectional components are wedged into the round holes. Each loading and unloading operation causes the sharp edges of the component to cut into and wear on the elastomeric material lining the holes. With continuous production use, it is not uncommon to replace a holding fixture of the type described in the above patents in a few weeks or months.

When abrasive wear and temperature degradation reaches a point necessitating repair or replacement, existing carrier plates exhibit further drawbacks. Though less expensive to repair than replace, repair requires dissolving and scrapping and otherwise removing the compliant material from the aluminum plate. Then fresh material must be applied, cured, and redrilled. This is time consuming and expensive to accomplish, and the damaged carrier plate must be taken out of service and shipped to repair facilities having the means for performing these operations. Consequently it is desirable to have a carrier plate that can be quickly and easily repaired—one enabling replacement of the compliant material by a user with a few simple operations.

Thus, it is desirable to have a new and improved carrier plate that alleviates the above mentioned concerns, while being compatible with other existing component handling equipment.

SUMMARY OF THE INVENTION

The present invention is a means to hold miniature electronic components such as capacitors, resistors and electrical connector pins. It comprises a solid base plate having upper and lower major surfaces and an array of openings which extend through the base plate and provide communication between the upper and lower surfaces. The diameter of the openings in the base plate are at least as large as the largest areal dimension, i.e., width and thickness, of such components. The present invention further compresses a layer of elastomeric material over the base plate. The elastomeric material has an array of openings which extend from its upper to its lower major surfaces and which are in alignment with the openings in the base.

The openings may be any shape, e.g., they may be substantially rectangular, square, circular or eliptical in cross-section. However, if the openings are substantially rectangular or square, at least one of the areal dimensions of the openings in the elastomeric material is smaller than the corresponding dimension of such component. Similarly, if the openings in the elastomeric material are substantially circular or rectangular their diameter or major dimension is smaller than the smallest areal dimension of such components. When the components are inserted into the holding means of the present invention with their ends extending through and thus exposed, e.g., by the vacuum assisted vibration equipment and the bank of pins described above, they are held in place by the gripping action of the elastomeric material, in tension, against the sides of the components. A series of slits in the elastomeric material, which extend the openings so that they correspond to the dimensions of the components, assist in the ready insertion and removal of the components and their being held in place by the elastomeric material.

DESCRIPTION OF THE PREFERRED EMBODIMENTS

Figure 1:
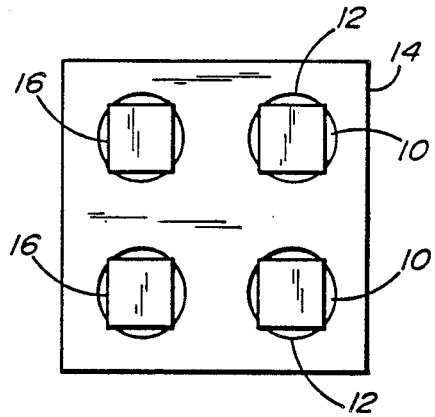
FIG. 1 is an enlarged fragmentary plan view of a holding means according to the prior art.
Figure 2:
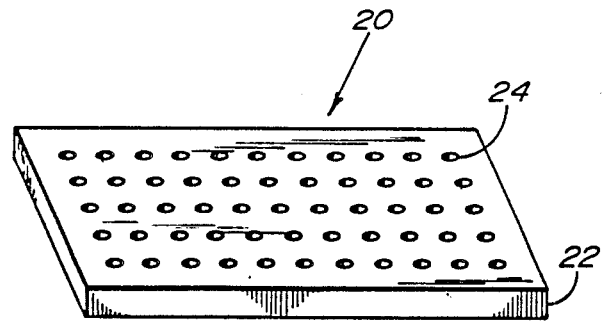
FIG. 2 is a plan view of a holding means according to the present invention.
Figure 3:
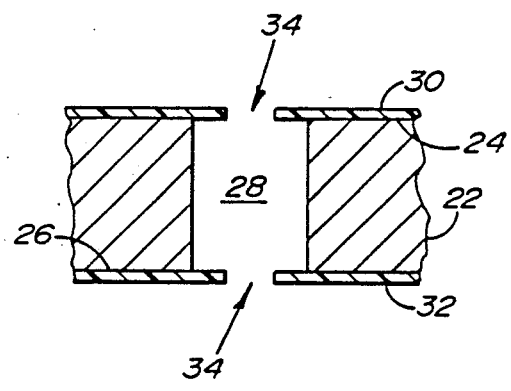
FIG. 3 is an enlarged cross-section of an opening in a holding means according to the present invention.

Referring now to the drawings and more particularly to FIGS. 2 and 3 there is shown a holding means 20 for miniature electronic components constructed in accordance with the present invention. It comprises a solid, preferably rectangular base plate 22 having upper surface 24 and lower surface 26. The base plate may be constructed of any lightweight, rigid, durable material such as aluminum or plastic.

A regular array of spaced-apart openings 28 are drilled in the base plate to provide open communication between the upper and lower surfaces 24, 26. The diameter of the openings 28 are at least as large as the largest areal dimension, i.e., the width and thickness of such components.

A sheet of elastomeric or other flexible, resilient material 30 is removably attached to the upper surface 24 of the base plate. A similar sheet of elastomeric material may also be removably attached to the lower surface 26 of the base plate. The elastomeric material may be selected from plastics or natural or artificial rubbers such as silicon rubber, gum rubber, and neoprene rubber; silicon rubber is preferred. The elastomeric material may be removably attached to the base plate by means of film adhesives which are well known to those skilled in the art.

The upper and lower sheets of elastomeric material has an array of openings 34, which extend from their upper to their lower major surfaces. The openings 34 are also in alignment with the openings 28 in the base plate 22. The openings may be any shape in cross-section, e.g., substantially rectangular, square, circular or eliptical. However, if they are substantially rectangular or square at least one of the areal (width and thickness) dimensions of the openings 34 is smaller than the corresponding dimension of the components being held. Similarly, if the cross-section of the openings is circular or eliptical the diameter or major dimension is smaller than the smaller of the areal dimensions of such components.

Figure 4:
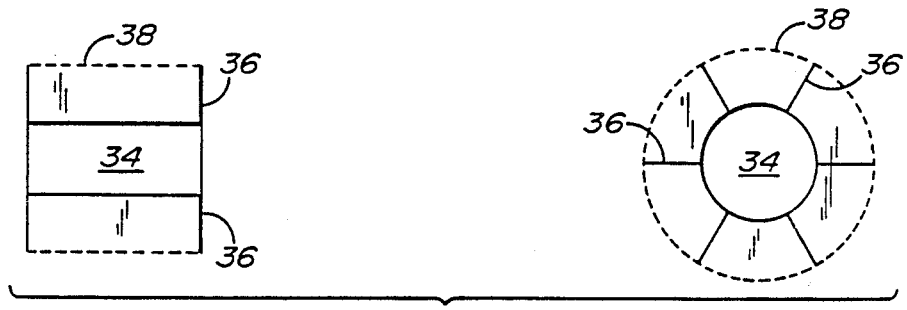
FIG. 4 is an enlarged plan view of two different types of openings in a holding means according to the present invention; and, FIG. 5 is an enlarged partial cross-sectional view of component being held in place in an opening in a holding means according to the present invention.

A series of slits 36 are preferably cut into the elastomeric material such that when the components are inserted into the holding means with their ends extending through and thus exposed the dimensions of the opening 34 can readily expand to be substantially the same as the actual dimensions of the component being held. The dotted lines 38 in FIG. 4 pictorially represent such actual dimensions. If the openings 34 are rectangular in cross-section the slits 34 are cut on either side of the areal dimension of the opening which is smaller than the corresponding areal dimension of the components being held.

Figure 5:
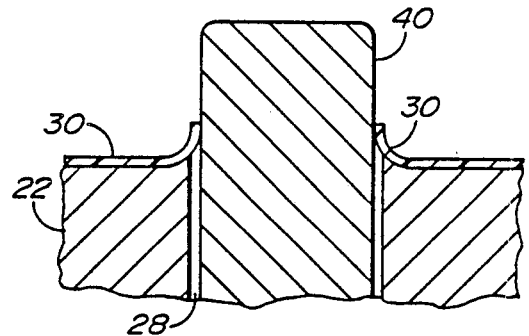

As best shown in FIG. 5 when the components 40 are inserted into the holding means of the present invention, e.g., by the vacuum assisted vibration equipment, funnels and bank of pins of the patents cited above, they are forced through and held in place by the gripping action of the elastomeric material, in tension, against the sides of the component. This gripping action also provides a tight conforming seal on all sides of the component to effectively mask off the portion of the component still within the opening 28. This conforming seal is very important when the exposed five surfaces of the component are to be treated, e.g., by spray coating or sputtering on a metal-based coating, and it is neither intended nor desired to similarly treat the unexposed portion. The conforming fit prevents the metal coating from being inadvertently deposited on the unexposed sides of the component.

The present invention has the advantage of being used a great number of times without wearing out. Whereas prior art devices remain servicable for only weeks or months, the subject invention remains servicable for years.

The present invention also has the advantage of being readily and inexpensively repaired. If the resilient material on a surface should ever wear out it can easily removed and replaced with another.

As various changes may be made in the form, construction and arrangement of the holding means described above without departing from the spirit and scope of the invention, all matter is intended to be interpreted as illustrative and not limiting. The invention is intended to be defined by the following claims and not by the description which precedes it.

What is claimed is:

1. A holding means for miniature electronic components having substantially squared edges comprising a base plate having upper and lower major surfaces and an array of spaced apart openings which extend through the base plate and provide communication between such upper and lower surfaces, the diameter of the openings being at least as large as the largest areal dimension of the components being held; a first layer of an elastomeric material removably attached to the upper surface of the base plate, the first layer of elastomeric material having an array of openings therein aligned with the openings in the base plate, the cross-sectional area of the openings being smaller than the cross-sectional area of the components to be held, and at least one slit cut into the elastomeric material adjacent each opening such that when a component is inserted into such opening the areal dimensions of the opening are substantially the same as the areal dimensions of such components; and, a second layer of elastomeric material removably attached to the lower surface of the base plate, the second layer of the elastomeric material having an array of openings therein aligned with the openings in the base plate and the openings in the first layer of elastomeric material, the cross-sectional area of the openings in the second layer of elastomeric material being smaller than the cross-sectional area of the components to be held therein, wherein when components are inserted into the holding means they are held in place by the gripping action of the elastomeric material, in tension, along the sides of the components.

2. A holding means according to claim 1 further comprising at least one slit cut into the second layer of the elastomeric material adjacent each opening.

3. A holding means according to claim 1 wherein the openings in the elastomeric material are substantially rectangular in cross-section.

4. A holding means according to claim 3 further comprising a slit cut into the elastomeric material on either side of the areal dimension of the openings therein which are smaller than the corresponding areal dimension of the components being held.

5. A holding means according to claim 1 wherein the openings in the elastomeric material are substantially circular in cross-section.

* * * * *